United States Patent
Cao et al.

(10) Patent No.: US 10,418,803 B2
(45) Date of Patent: Sep. 17, 2019

(54) DIRECT CURRENT SWITCH-OFF DEVICE AND CONTROL METHOD THEREOF

(71) Applicants: NR Electric Co., Ltd, Jiangsu (CN); NR Engineering Co., Ltd, Jiangsu (CN)

(72) Inventors: Dongming Cao, Nanjing (CN); Taixun Fang, Jiangsu (CN); Yeyuan Xie, Jiangsu (CN); Bing Yang, Jiangsu (CN); Wei Shi, Jiangsu (CN); Wei Lv, Jiangsu (CN); Wenjie Wang, Jiangsu (CN); Bin Liu, Jiangsu (CN); Tao Wang, Jiangsu (CN); Lele Li, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/066,653

(22) PCT Filed: Apr. 17, 2017

(86) PCT No.: PCT/CN2017/080819
§ 371 (c)(1),
(2) Date: Jun. 27, 2018

(87) PCT Pub. No.: WO2017/181927
PCT Pub. Date: Oct. 26, 2017

(65) Prior Publication Data
US 2019/0020193 A1    Jan. 17, 2019

(30) Foreign Application Priority Data

Apr. 19, 2016    (CN) .......................... 2016 1 0245174

(51) Int. Cl.
*H02H 7/26*    (2006.01)
*H01H 9/54*    (2006.01)
*H01H 33/59*    (2006.01)

(52) U.S. Cl.
CPC ............ *H02H 7/268* (2013.01); *H01H 9/542* (2013.01); *H01H 33/596* (2013.01); *H02H 7/26* (2013.01);
(Continued)

(58) Field of Classification Search
USPC ...................................................... 361/2–13
See application file for complete search history.

(56) References Cited

U.S. PATENT DOCUMENTS 4,300,181 A    11/1981   Premerlani
2012/0299393 A1*  11/2012  Hafner ................... H01H 9/542
                                                                  307/113
(Continued)

FOREIGN PATENT DOCUMENTS

| CN | 104901269 A | 9/2015 |
| CN | 105262068 A | 1/2016 |
| CN | 105790236 A | 7/2016 |
| CN | 205610214 U | 9/2016 |

OTHER PUBLICATIONS

WIPO, Chinese International Search Authority, International Search Report and Written Opinion with translation dated Jun. 30, 2017 in International Patent Application No. PCT/CN2017/080819, 14 pages.

*Primary Examiner* — Danny Nguyen
(74) *Attorney, Agent, or Firm* — Masuvalley & Partners

(57) ABSTRACT

A direct current switch-off device comprises an on-state current branch circuit and a current commutating and breaking unit which are connected in parallel. The on-state current branch circuit has a mechanical switch (S) and a current transfer module which are connected in series. The current commutating and breaking unit comprises a bridge-type branch circuit and a current-breaking branch circuit. The current-breaking branch circuit and two bridge arms of the bridge-type branch circuit are connected in parallel. The current-breaking branch circuit comprises a nonlinear resis- (Continued)

tor (RI) and a valve group consisting of fully-controlled devices connected in series. The nonlinear resistor (RI) and the valve group are connected in parallel. Two ends of each fully-controlled device in the valve group are connected in parallel with a buffering and reclosing circuit.

8 Claims, 8 Drawing Sheets

(52) U.S. Cl.
  CPC ............... *H01H 2009/543* (2013.01); *H01H 2009/544* (2013.01)

(56) References Cited

U.S. PATENT DOCUMENTS

| | | | | |
|---|---|---|---|---|
| 2013/0009491 | A1* | 1/2013 | Hafner | H02M 1/092 |
| | | | | 307/113 |
| 2013/0106184 | A1* | 5/2013 | Hafner | H02H 7/268 |
| | | | | 307/29 |
| 2015/0002977 | A1* | 1/2015 | Dupraz | H01H 9/542 |
| | | | | 361/115 |
| 2015/0229121 | A1* | 8/2015 | Davidson | H03K 17/0828 |
| | | | | 361/54 |
| 2015/0333496 | A1* | 11/2015 | Ergin | H01H 9/542 |
| | | | | 361/101 |
| 2015/0372473 | A1* | 12/2015 | Wang | H01H 71/1045 |
| | | | | 361/57 |

* cited by examiner

DIRECT CURRENT SWITCH-OFF DEVICE AND CONTROL METHOD THEREOF

RELATED APPLICATIONS

This application is the U.S. National Phase of and claims priority to International Patent Application No. PCT/CN2017/080819, International Filing Date Apr. 17, 2017, entitled Direct Current Switch-Off Device And Control Method Thereof; which claims priority to Chinese Application No. CN201610245174.3 filed Apr. 19, 2016 entitled DC Turn-Off Apparatus And Control Method Thereof; both of which are incorporated herein by reference in their entireties.

BACKGROUND OF THE INVENTION

Technical Field

The present invention relates to a direct current switch-off device and also to a control method of the direct current switch-off device, which belong to the technical field of direct current breakers.

Background Art

With the development of multi-terminal direct current transmission technologies, a direct current breaker will become one of the key devices that ensure safe and stable operation of the power system. Since a multi-terminal high-voltage direct current transmission system has a high voltage level and small line impedance, once a short-circuit failure occurs in a line, both the direct current grid and the alternating current grid will be influenced soon, so that the failure needs to be cleared in time. Therefore, the direct current breaker should act quickly to reduce the duration of the failure or limit the fault current to the maximum extent, thus lowering the impact of the failure on the alternating current/direct current grid.

The existing technologies of direct current breakers are generally divided into three types. 1) LC resonant direct current breakers: by adding an auxiliary circuit on the basis of a conventional alternating-current mechanical breaker, an amplified oscillating current is superimposed on a direct current during an arc breaking interval, and the circuit is disconnected when the current crosses zero. The mechanical breaker fabricated according to this principle cannot meet the requirements of a multi-terminal flexible direct current transmission system in terms of breaking time and current-breaking capability. 2) Solid-state direct current breakers: a direct current is directly cut off by using a high-power turn-off power electronic device. Although the solid-state breaker fabricated according to this principle can meet the requirements of a multi-terminal flexible direct current system in terms of time, an excessive loss occurs when the breaker is normally conducting current, resulting in poor economic benefits. 3) Hybrid direct current breakers: in a hybrid manner of using both a mechanical switch and a power electronic device, the mechanical switch is turned on to ensure a current flow in normal running and is turned off in the case of a failure, the current is transferred by a produced arc voltage to a branch circuit of the power electronic device which is connected in parallel with the mechanical switch, and the power electronic device cuts off the current. The breaker based on the principle not only reduces on-state loss, but also improves the breaking speed. However, to cut off line currents in two directions, a large number of fully-controlled devices need to be forwardly connected in series and then reversely connected in series. Due to the large quantity and high price of the fully-controlled devices, the direct current breaker is expensive, and the wide application and promotion of the direct current breaker are affected.

When a direct current transmission line is an overhead line, a line failure is mostly transient or temporary, and to improve the safety and reliability of line power supply, the direct current breaker needs to have a reclosing function. The reclosing of a direct current line may easily cause line voltage fluctuation, and the amplitude reaches double of a normal direct current voltage, which affects the safe and reliable operation of the system, so that a pre-charge operation needs to be performed on the faulty line first.

According to the Chinese Patent Application No. "201510661262.7" entitled "HIGH-VOLTAGE DIRECT CURRENT BREAKER AND CONTROL METHOD THEREOF", although a reclosing operation can be performed, a large switching overvoltage is produced as a pre-charge process is not performed on the line during the reclosing operation, which has a negative effect on safe operation of the device.

SUMMARY OF THE INVENTION

An objective of the present invention is to solve the deficiencies in the prior art, and provide a direct current switch-off device, which significantly reduces the equipment cost and increases the equipment extensibility on the premise of ensuring a sufficiently high breaking speed and low loss. Besides, the direct current switch-off device has a reclosing function, and line voltage fluctuation is significantly reduced during the reclosing operation.

To achieve the above objective, the present invention adopts the following technical solutions:

A direct current switch-off device includes an on-state current branch circuit and a current commutating and breaking unit which are connected in parallel. The on-state current branch circuit includes a mechanical switch and a current transfer module which are connected in series. The current commutating and breaking unit includes a bridge-type branch circuit and a current-breaking branch circuit. The current-breaking branch circuit and two bridge arms of the bridge-type branch circuit are connected in parallel. The current-breaking branch circuit includes one or more current-breaking modules connected in series. Each current-breaking module includes a nonlinear resistor and a valve group consisting of fully-controlled devices connected in series. The nonlinear resistor and the valve group are connected in parallel. Two ends of each fully-controlled device in the valve group are connected in parallel with a buffering and reclosing circuit.

As a further preferred solution of the present invention, the current transfer module includes a nonlinear resistor and a fully-controlled device module which are connected in parallel. The fully-controlled device module consists of one or more full-bridge submodules connected in series. Each full-bridge submodule includes four bridged fully-controlled devices and an RCD module. Bridge arms of the full-bridge submodule are connected in parallel with the RCD module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively.

As a further preferred solution of the present invention, the specific structure of the buffering and reclosing circuit includes the following types:

1. The buffering and reclosing circuit includes a capacitor, a resistor, and a reclosing module which are connected in parallel.

2. The buffering and reclosing circuit includes an RCD module and a reclosing module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively. The reclosing module and the RCD module are connected in parallel.

3. The buffering and reclosing circuit includes an RCD module and a reclosing module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively. The reclosing module is connected in parallel on two ends of the capacitor in the RCD module.

As a further preferred solution of the present invention, the reclosing module includes a resistor and a fully-controlled device which are connected in series. Alternatively, the reclosing module includes a resistor, a fully-controlled device, and an uncontrolled device. The resistor and the fully-controlled device are connected in series. The uncontrolled device is connected in parallel on two ends of the resistor. The fully-controlled device and the uncontrolled device are connected in series in opposite directions.

The present invention further discloses a control method of the direct current switch-off device, which specifically includes the following steps:

1) when a direct current system is operating normally, turning on the mechanical switch, such that the fully-controlled devices in the current transfer module are in an on-state; and a steady-state current flows through the mechanical switch and the current transfer module which are connected in series in the on-state current branch circuit;

2) when a short-circuit failure occurs in the direct current system:

201. turning on the valve group consisting of fully-controlled devices connected in series in the current-breaking branch circuit, and blocking the fully-controlled devices in the current transfer module in the on-state current branch circuit;

202. after the current in the on-state current branch circuit is completely transferred to the bridge-type branch circuit and the current-breaking branch circuit, turning off the mechanical switch in the on-state current branch circuit;

203. after arc-free breaking of the mechanical switch, blocking the valve group consisting of fully-controlled devices connected in series in the current-breaking branch circuit, such that the fault current is transferred into the nonlinear resistor till the system energy is dissipated by the nonlinear resistor, and the direct current breaker completes breaking;

3) when reclosing is performed after failure breaking:

301. turning on the reclosing modules for the valve group consisting of fully-controlled devices connected in series in the current-breaking branch circuit;

302. determining whether the faulty line is recovered;

(1) if the line failure is not recovered, turning off the reclosing modules for the valve group consisting of fully-controlled devices connected in series in the current-breaking branch circuit, and ending the reclosing;

(2) if the line failure is recovered, turning on the valve group consisting of fully-controlled devices connected in series in the current-breaking branch circuit, turning off the reclosing modules for the valve group consisting of fully-controlled devices connected in series in the current-breaking branch circuit, and performing Step 303;

303. turning on the mechanical switch in the on-state current branch circuit and turning on the fully-controlled devices in the current transfer module in the on-state current branch circuit;

304. turning off the valve group consisting of fully-controlled devices connected in series in the current-breaking branch circuit, and ending the reclosing.

As a further preferred solution, in Step 302, whether the line failure is recovered is determined based on the following criteria:

1) the voltage on the faulty line is charged;
2) no voltage exists on two ends of the current-breaking branch circuit;
3) no voltage exists on two ends of the valve group consisting of fully-controlled devices connected in series in the current-breaking branch circuit;
4) no voltage exists on two ends of each fully-controlled device in the valve group in the current-breaking branch circuit;
5) no voltage exists on two ends of the capacitor in the buffering and reclosing circuit for each fully-controlled device in the valve group in the current-breaking branch circuit.

Compared with the prior art, the present invention achieves the following beneficial effects:

1. By introducing the bridge-type branch circuit formed of the valve group consisting of uncontrolled devices connected in series into the present invention, the current-breaking branch circuit can cut off a bidirectional line current, such that the number of the fully-controlled devices is significantly reduced. Since the uncontrolled device has stronger current conducting capability and a much lower price than the fully-controlled device, the equipment cost can be largely reduced.

2. Each commutating module in the bridge-type branch circuit of the present invention is formed by the valve group consisting of uncontrolled devices connected in series and an inductor which are connected in series. The bridge-type structure of the uncontrolled devices realizes a current commutating function. The serially-connected inductor limits the current change rate in the current commutating process.

3. When the breaker provided by the present invention is operating normally, the mechanical switch and a few power electronic devices are used to ensure the current flow, so that the on-state loss is small.

4. The breaker provided by the present invention can realize arc-free breaking of the mechanical switch, prolong the service life of the switch, improve the breaking speed of the switch, and easily solve the voltage sharing problem during serial connection of the switch.

5. The breaker provided by the present invention can realize a reclosing function, and reduce line voltage fluctuation caused by a reclosing operation.

DETAILED DESCRIPTION OF THE INVENTION

Figure 1:
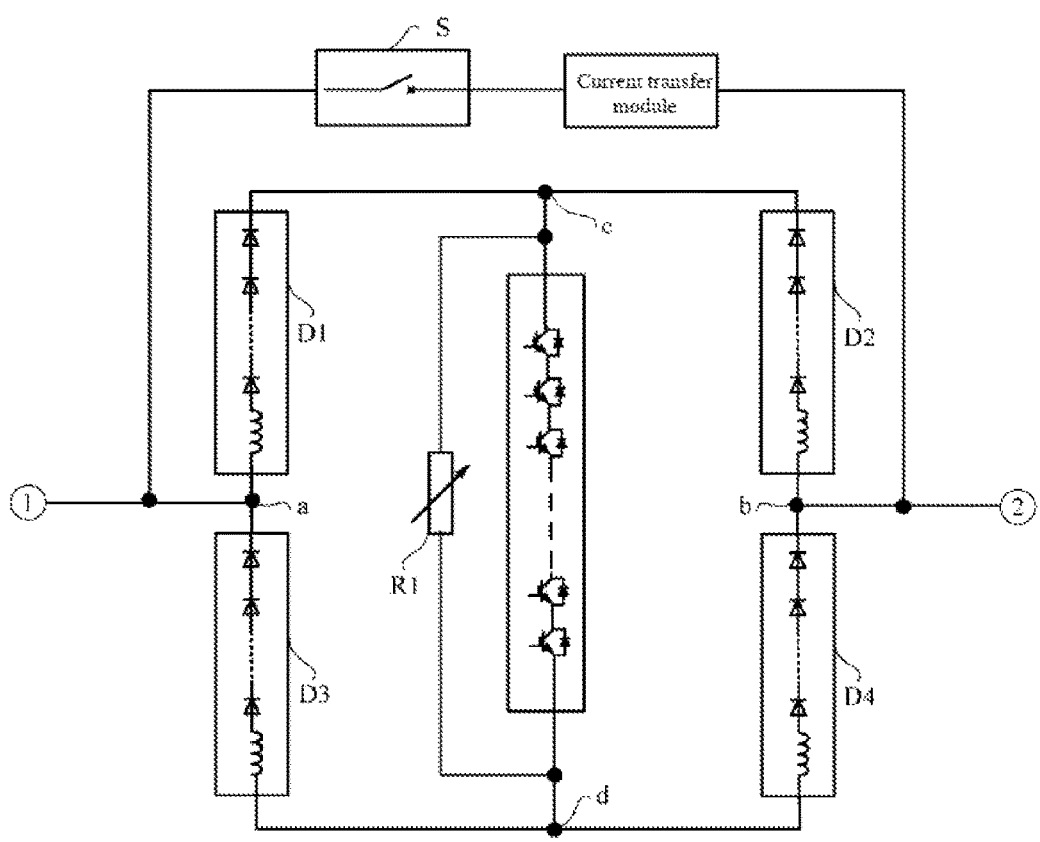
FIG. 1 is a circuit diagram of a first embodiment of a direct current switch-off device provided by the present invention.

The present invention is further described below by reference to the accompanying drawings. The embodiments below are merely used for illustrating the technical solutions of the present invention more clearly, instead of limiting the protection scope of the present invention.

A direct current switch-off device disclosed by the present invention includes an on-state current branch circuit and a current commutating and breaking unit.

The on-state current branch circuit includes a mechanical switch S and a current transfer module which are connected in series. The current transfer module contains fully-controlled devices. The mechanical switch S is mainly used for blocking the voltage. After a current-breaking branch circuit is disconnected, a high breaking voltage is produced on two ends of the on-state current branch circuit, the mechanical switch S can bear a high breaking voltage, and the current transfer module bears a small breaking voltage. The current transfer module contains a few fully-controlled devices, and the on-state resistance of the mechanical switch S is small, such that in a normal working state, the loss of the line current flowing through the on-state current branch circuit is small.

The current commutating and breaking unit includes: a bridge-type branch circuit and a current-breaking branch circuit.

The current-breaking branch circuit is mainly used for interrupting a fault current in a line, and can bear a high breaking voltage. The current-breaking branch circuit consists of N current-breaking modules connected in series, where N is an integer not less than 1. Each current-breaking module includes: a nonlinear resistor R1 and a valve group consisting of fully-controlled devices connected in series. The nonlinear resistor R1 and the valve group are connected in parallel. After the current-breaking branch circuit receives a breaking instruction, all the fully-controlled devices in the valve group are disconnected synchronously, and a breaking voltage is produced between an electric node c and an electric node d afterwards. The impedance of the nonlinear resistor R1 connected in parallel on two ends of the valve group changes due to the high voltage, the current is eventually commutated to the nonlinear resistor R1, and the energy is absorbed by the nonlinear resistor R1. It should be noted that, the total number of the fully-controlled devices applied in the current-breaking branch circuit is fixed, and the number of the fully-controlled devices in each valve group is equally distributed according to the number of the valve groups, that is, a greater value of N leads to a smaller number of fully-controlled devices in each valve group. By connecting a plurality of current-breaking modules in series, the volume of a single current-breaking module is reduced and extension and integration of the current-breaking modules are facilitated. Besides, two ends of each fully-controlled device in the valve group of the current-breaking module are connected in parallel with a buffering and reclosing module. In a switch-off process, a buffering capacitor connected in parallel on two ends of each fully-controlled device can effectively reduce a voltage spike magnitude of the fully-controlled device and improve the voltage balancing effect when the valve group consisting of fully-controlled devices connected in series is inconsistently driven. In a reclosing process, a reclosing module is first turned on to charge a faulty line, and line voltage fluctuation caused by the reclosing operation can be reduced.

The bridge-type branch circuit includes four electric nodes and four identical commutating modules which are bridged together. A commutating module D1 and a commutating module D3 are forwardly connected in series through an electric node a, to form a first bridge arm of the bridge-type branch circuit. A commutating module D2 and a commutating module D4 are forwardly connected in series through an electric node b, to form a second bridge arm of the bridge-type branch circuit. The commutating module D1 is electrically connected to the commutating module D2 through an electric node c. The commutating module D3 is electrically connected to the commutating module D4 through an electric node d, such that the first bridge arm and the second bridge arm are forwardly connected in parallel. A connection line extends from the electric node a and the electric node b respectively to serve as a connection terminal of the current commutating and breaking unit. The current-breaking branch circuit is connected between the electric node c and the electric node d.

Each commutating module consists of a valve group consisting of uncontrolled devices connected in series and an inductor which are connected in series. When the current is transferred from the on-state current branch circuit to the bridge-type branch circuit and the current-breaking branch circuit, since the fully-controlled devices are switched off quickly, the current is transferred rapidly, and the current passing through the uncontrolled devices in the bridge-type branch circuit rises rapidly. Therefore, the serially-connected inductor is mainly used for suppressing a large current change rate (di/dt) during the commutation process, to prevent damages to a power device. The bridge-type structure of the valve group consisting of uncontrolled devices connected in series realizes a current commutating function, which is specifically illustrated as follows. When the line current direction is from the electric node a to the electric node b, the current flows through the current-breaking branch circuit by means of the commutating modules D1 and D4, and in this case, the commutating modules D1 and D4 are switched on and the commutating modules D2 and D3 are switched off. After the current-breaking branch circuit is switched off, the commutating modules D2 and D3 bear a high voltage. When the line current direction is from the electric node b to the electric node a, the current flows through the current-breaking branch circuit by means of the commutating modules D2 and D3, and in this case, the commutating modules D2 and D3 are switched on and the commutating modules D1 and D4 are switched off. After the current-breaking branch circuit is switched off, the commutating modules D1 and D4 bear a high voltage.

The specific connecting structure of the direct current switch-off device is further described in detail below with reference to specific embodiments.

First Embodiment of the Direct Current Switch-Off Device

As shown in FIG. 1, one on-state current branch circuit and one current commutating and breaking unit are provided, and the on-state current branch circuit is connected in parallel on two ends of the current commutating and breaking unit. The current-breaking branch circuit is merely provided with one current-breaking module, which includes a nonlinear resistor R1 and a valve group consisting of fully-controlled devices forwardly connected in series. The nonlinear resistor R1 and the valve group are connected in parallel.

Second Embodiment of the Direct Current Switch-Off Device

Figure 2:
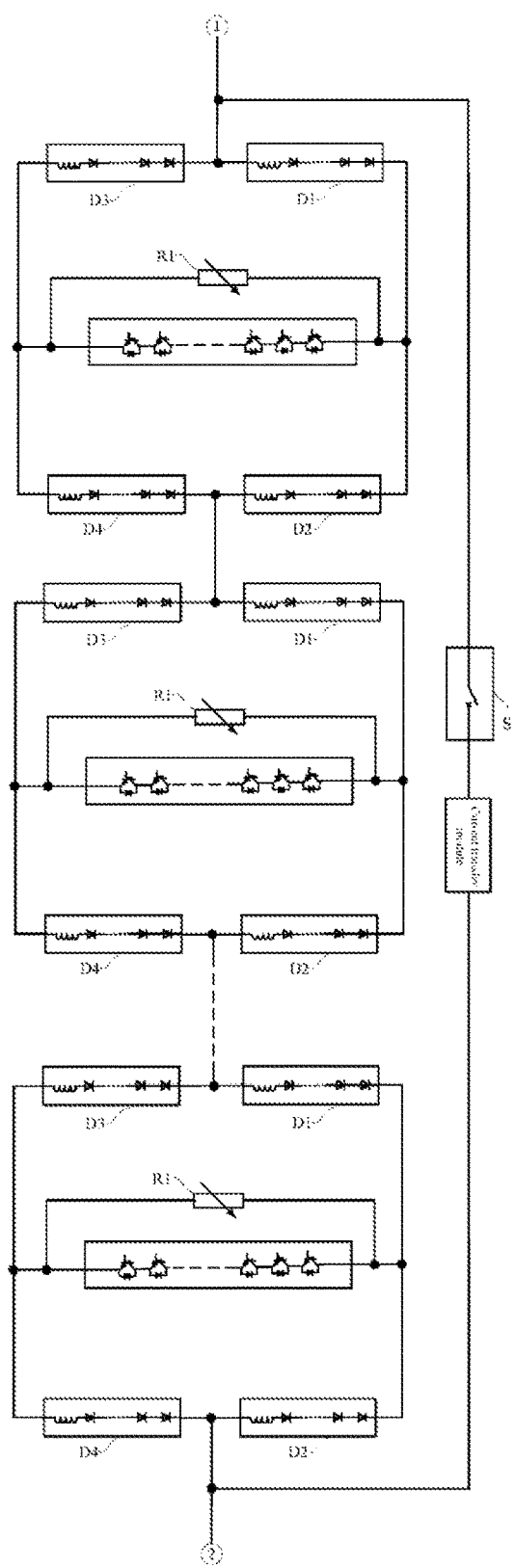
FIG. 2 is a circuit diagram of a second embodiment of the direct current switch-off device provided by the present invention.

As shown in FIG. 2, the difference from the first embodiment of the direct current switch-off device lies in that: multiple current commutating and breaking units are provided, which are sequentially connected in series and then connected to the on-state current branch circuit.

Third Embodiment of the Direct Current Switch-Off Device

Figure 3:
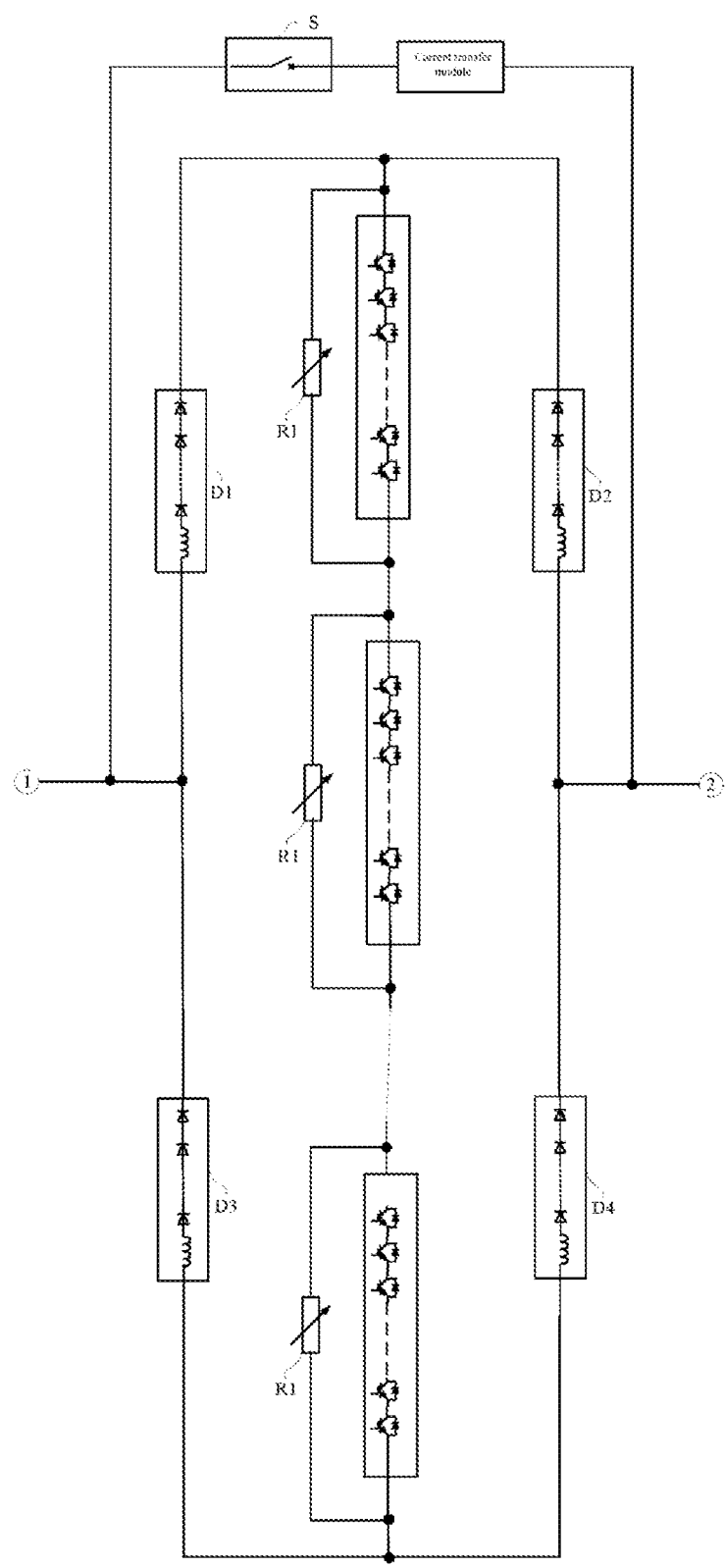
FIG. 3 is a circuit diagram of a third embodiment of the direct current switch-off device provided by the present invention.

As shown in FIG. 3, the difference from the first embodiment of the direct current switch-off device lies in that: the current-breaking branch circuit in the current commutating and breaking unit is provided with multiple nonlinear resistors R1 connected in series, and two ends of each nonlinear resistor R1 are connected in parallel with a valve group consisting of fully-controlled devices connected in series. However, the number of the fully-controlled devices in all the valve groups in the present embodiment is equal to the number of the fully-controlled devices in the valve group in the first embodiment of the direct current switch-off device. The number of the fully-controlled devices in each valve group in the present embodiment is equally distributed according to the number of the valve groups. The volume of a single current-breaking module can be reduced by using this connecting structure.

Fourth Embodiment of the Direct Current Switch-Off Device

Figure 4:
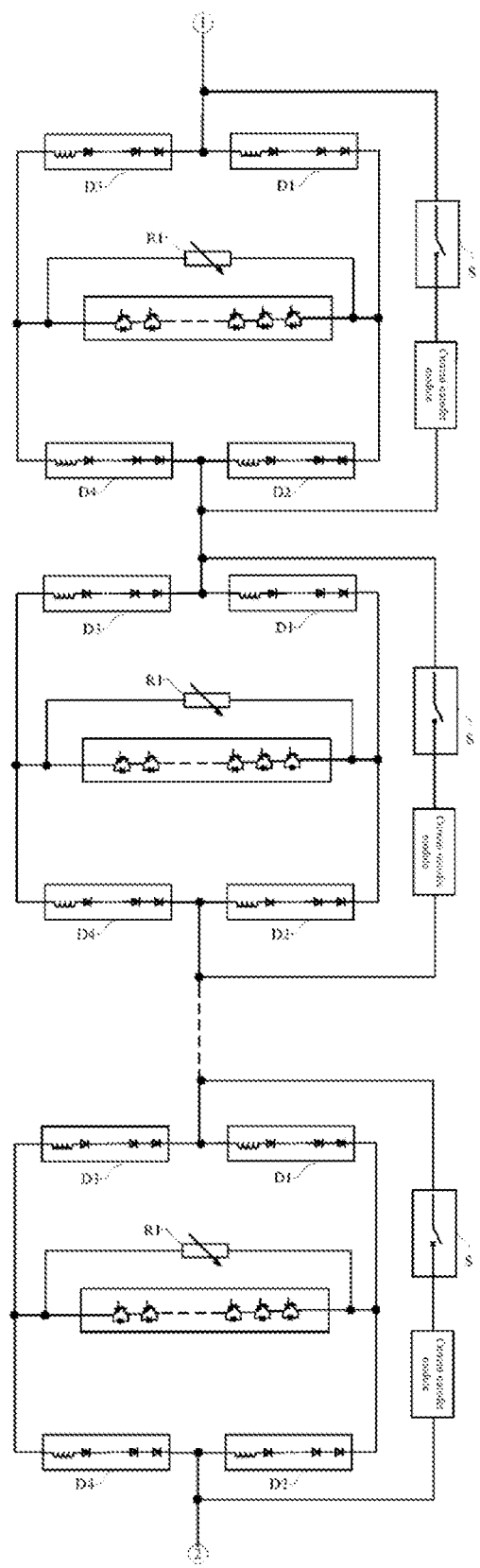
FIG. 4 is a circuit diagram of a fourth embodiment of the direct current switch-off device provided by the present invention.

As shown in FIG. 4, the difference from the first embodiment of the direct current switch-off device lies in that: multiple on-state current branch circuits and multiple current commutating and breaking units are provided, all the on-state current branch circuits are sequentially connected in series, and the current commutating and breaking units and the on-state current branch circuits are connected in parallel in one-to-one correspondence.

Fifth Embodiment of the Direct Current Switch-Off Device

The difference from the second embodiment of the direct current switch-off device lies in that: the current-breaking branch circuit in the third embodiment of the direct current switch-off device is adopted.

Sixth Embodiment of the Direct Current Switch-Off Device

The difference from the fourth embodiment of the direct current switch-off device lies in that: the current-breaking branch circuit in the third embodiment of the direct current switch-off device is adopted.

The following five embodiments of the current transfer module are provided, and the structure of each of the above direct current switch-off devices can adopt any of the five types of current transfer modules. The current transfer module is further described below with reference to FIG. 5 to FIG. 9.

First Embodiment of the Current Transfer Module

Figure 5:
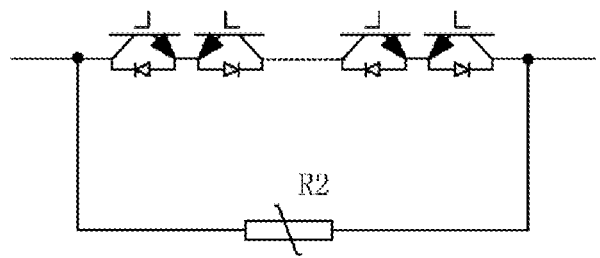
FIG. 5 is a circuit diagram of a first embodiment of a current transfer module.

As shown in FIG. 5, the current transfer module includes a nonlinear resistor R2 and a fully-controlled device module which are connected in parallel. The fully-controlled device module includes more than two fully-controlled devices connected in series, and at least two fully-controlled devices are reversely connected in series.

Second Embodiment of the Current Transfer Module

Figure 6:
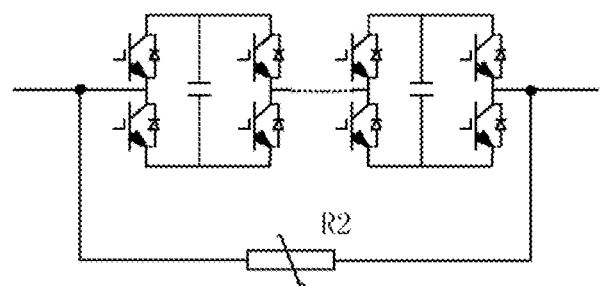
FIG. 6 is a circuit diagram of a second embodiment of the current transfer module.

As shown in FIG. 6, the current transfer module includes a nonlinear resistor R2 and a fully-controlled device module which are connected in parallel. The fully-controlled device module consists of one or more than two full-bridge submodules which are connected in series. Each full-bridge submodule includes four bridged fully-controlled devices, and two ends of the bridge arms of the full-bridge submodule are further connected in parallel with a capacitor.

Third Embodiment of the Current Transfer Module

Figure 7:
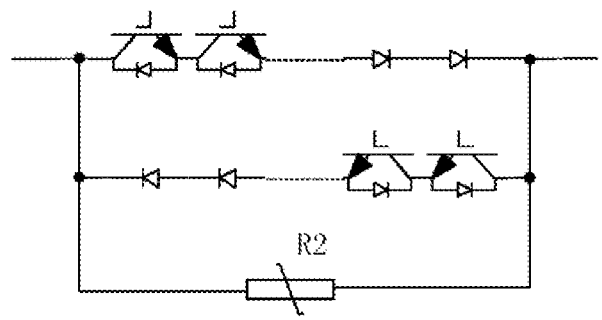
FIG. 7 is a circuit diagram of a third embodiment of the current transfer module.

As shown in FIG. 7, the current transfer module includes a nonlinear resistor R2 and two unidirectional through-current modules. The two unidirectional through-current modules are reversely connected in parallel and then connected in parallel with the nonlinear resistor R2. Each unidirectional through-current module includes: at least a pair of fully-controlled devices and at least a pair of uncontrolled devices, and the fully-controlled devices are forwardly connected in series with the uncontrolled devices.

Fourth Embodiment of the Current Transfer Module

Figure 8:
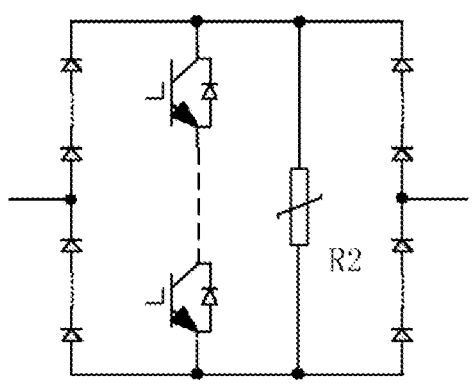
FIG. 8 is a circuit diagram of a fourth embodiment of the current transfer module.

As shown in FIG. 8, the current transfer module includes a nonlinear resistor R2, a module consisting of fully-controlled devices connected in series, and an uncontrolled device full-bridge module. The nonlinear resistor and the module consisting of fully-controlled devices connected in series are connected in parallel with two bridge arms of the uncontrolled device full-bridge module. The module consisting of fully-controlled devices connected in series includes at least two fully-controlled devices forwardly connected in series. Each bridge arm of the uncontrolled device full-bridge module is formed by at least two uncontrolled devices forwardly connected in series. The middle points of the two bridge arms serve as an input end and an output end of the current transfer module respectively.

Fifth Embodiment of the Current Transfer Module

Figure 9:
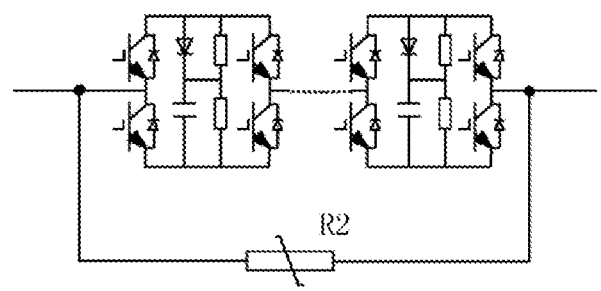
FIG. 9 is a circuit diagram of a fifth embodiment of the current transfer module.

As shown in FIG. 9, the current transfer module includes a nonlinear resistor R2 and a fully-controlled device module. The fully-controlled device module consists of one or more than two full-bridge submodules which are connected in series. Each full-bridge submodule includes four bridged fully-controlled devices and one RCD module. Bridge arms of the full-bridge submodule are connected in parallel with the RCD module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively.

The following six embodiments of the buffering and reclosing module are provided, and the structure of each of the above direct current switch-off devices can adopt any of the six types of buffering and reclosing modules. The buffering and reclosing module is further described below with reference to FIG. 10 to FIG. 15.

First Embodiment of the Buffering and Reclosing Module

Figure 10:
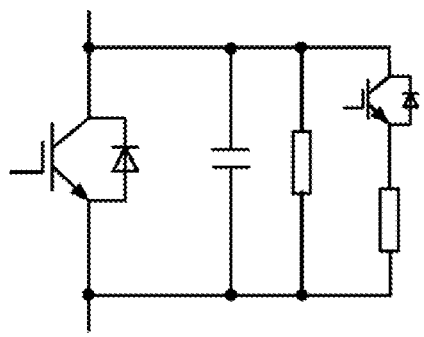
FIG. 10 is a circuit diagram of a first embodiment of a buffering and reclosing circuit.

As shown in FIG. 10, the buffering and reclosing circuit includes a capacitor, a resistor, and a reclosing module which are connected in parallel. The reclosing module includes a resistor and a fully-controlled device which are connected in series.

Second Embodiment of the Buffering and Reclosing Module

Figure 11:
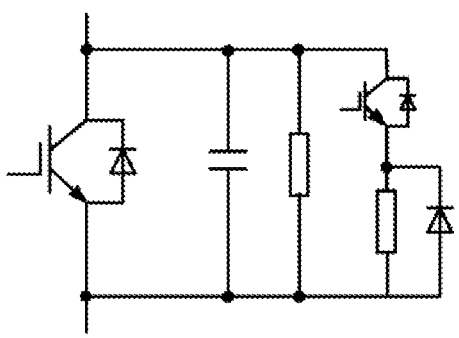
FIG. 11 is a circuit diagram of a second embodiment of the buffering and reclosing circuit.

As shown in FIG. 11, the buffering and reclosing circuit includes a capacitor, a resistor, and a reclosing module which are connected in parallel. The reclosing module includes a resistor, a fully-controlled device, and an uncontrolled device. The resistor and the fully-controlled device are connected in series. The uncontrolled device is connected in parallel on two ends of the resistor. The fully-controlled device and the uncontrolled device are connected in series in opposite directions.

Third Embodiment of the Buffering and Reclosing Module

Figure 12:
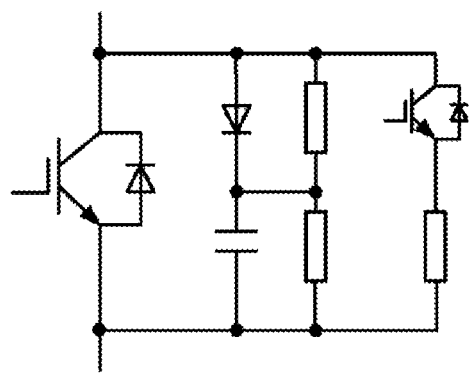
FIG. 12 is a circuit diagram of a third embodiment of the buffering and reclosing circuit.

As shown in FIG. 12, the buffering and reclosing circuit includes an RCD module and a reclosing module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively. The reclosing module includes a resistor and a fully-controlled device which are connected in series. The reclosing module and the RCD module are connected in parallel.

Fourth Embodiment of the Buffering and Reclosing Module

Figure 13:
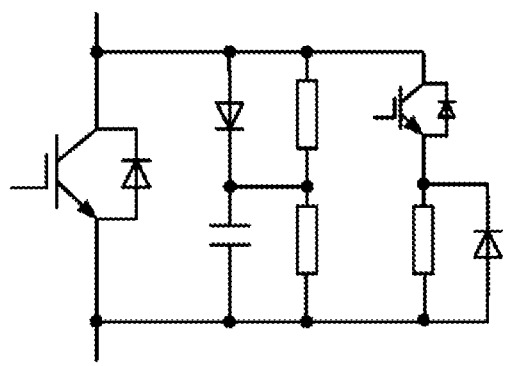
FIG. 13 is a circuit diagram of a fourth embodiment of the buffering and reclosing circuit.

As shown in FIG. 13, the buffering and reclosing circuit includes an RCD module and a reclosing module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively. The reclosing module includes a resistor, a fully-controlled device, and an uncontrolled device. The resistor and the fully-controlled device are connected in series. The uncontrolled device is connected in parallel on two ends of the resistor. The fully-controlled device and the uncontrolled device are connected in series in opposite directions. The reclosing module and the RCD module are connected in parallel.

Fifth Embodiment of the Buffering and Reclosing Module

Figure 14:
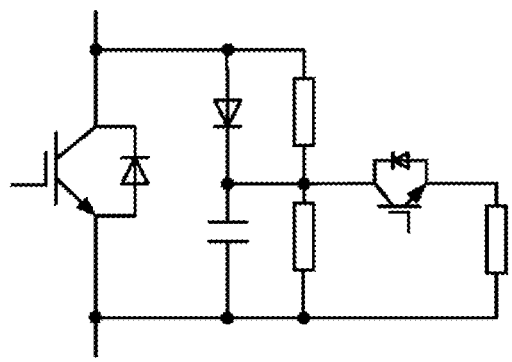
FIG. 14 is a circuit diagram of a fifth embodiment of the buffering and reclosing circuit.

As shown in FIG. 14, the buffering and reclosing circuit includes an RCD module and a reclosing module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively. The reclosing module includes a resistor and a fully-controlled device which are connected in series. The reclosing module is connected in parallel on two ends of the capacitor in the RCD module.

Sixth Embodiment of the Buffering and Reclosing Module

Figure 15:
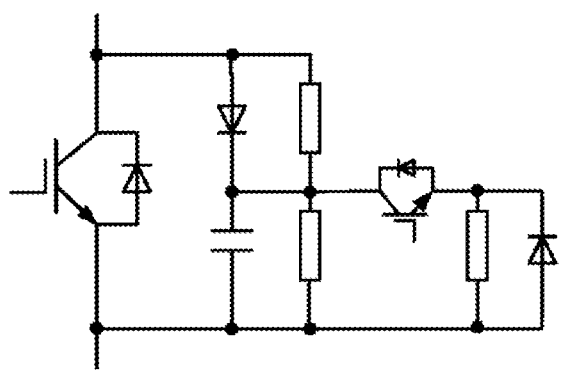
FIG. 15 is a circuit diagram of a sixth embodiment of the buffering and reclosing circuit.

As shown in FIG. 15, the buffering and reclosing circuit includes an RCD module and a reclosing module. The RCD module includes an uncontrolled device, a capacitor, and two resistors. The uncontrolled device and the capacitor are connected in series, a cathode of the uncontrolled device is connected to one end of the capacitor, and the two resistors are connected in parallel on two ends of the uncontrolled device and on two ends of the capacitor respectively. The reclosing module includes a resistor, a fully-controlled device, and an uncontrolled device. The resistor and the fully-controlled device are connected in series. The uncontrolled device is connected in parallel on two ends of the resistor. The fully-controlled device and the uncontrolled device are connected in series in opposite directions. The reclosing module is connected in parallel on two ends of the capacitor in the RCD module.

Each of the above fully-controlled devices needs to have a current switch-on/switch-off capability, and can be selected from gate turn-off devices such as IGBT, EGBT, GTO, and MOSFET. The uncontrolled device does not need to have the current switch-on/switch-off capability, and may be a crystal diode.

In use, the direct current switch-off device is connected in series in a direct current system through the electric node a and the electric node b. By means of commutation through the uncontrolled device full-bridge circuit, the number of the fully-controlled devices can be largely reduced, and the equipment cost is lowered.

The present invention provides a control method of the direct current switch-off device, in which any of the above structures of the direct current switch-off device can be adopted. The specific control method is as follows:

1) when a direct current system is operating normally, turning on the mechanical switch S, such that the fully-controlled devices in the current transfer module are in an on-state; and a steady-state current passes through the mechanical switch and the current transfer module which are connected in series in the on-state current branch circuit;

2) when a short-circuit failure occurs in the direct current system:

(1) firstly, turning on the valve group consisting of fully-controlled devices connected in series in the current-breaking branch circuit, and blocking the fully-controlled devices in the current transfer module in the on-state current branch circuit;

(2) after the current in the on-state current branch circuit is completely transferred to the bridge-type branch circuit and the current-breaking branch circuit, turning off the mechanical switch S in the on-state current branch circuit;

(3) after arc-free breaking of the mechanical switch S, blocking the valve group consisting of fully-controlled devices connected in series in the current-breaking branch circuit, such that the fault current is transferred into the nonlinear resistor R1 till the system energy is dissipated by the nonlinear resistor R1, and the direct current breaker completes breaking;

3) when reclosing is performed after failure breaking:

(1) firstly, turning on the reclosing modules for the valve group consisting of fully-controlled devices connected in series in the current-breaking branch circuit;

(2) determining whether the faulty line is recovered, where whether the line failure is recovered is determined based on any of the following criteria: 1) the voltage on the faulty line is charged; 2) no voltage exists on two ends of the current-breaking branch circuit; 3) no voltage exists on two ends of the valve group consisting of fully-controlled devices connected in series in the current-breaking branch circuit; 4) no voltage exists on two ends of each fully-controlled device in the valve group in the current-breaking branch circuit; 5) no voltage exists on two ends of the capacitor in the buffering and reclosing circuit for each fully-controlled device in the valve group in the current-breaking branch circuit.

(3) if the line failure is not recovered, turning off the reclosing modules for the valve group consisting of fully-controlled devices connected in series in the current-breaking branch circuit, and proceeding to (7);

(4) if the line failure is recovered, turning on the valve group consisting of fully-controlled devices connected in series in the current-breaking branch circuit, and turning off the reclosing modules for the valve group consisting of fully-controlled devices connected in series in the current-breaking branch circuit;

(5) turning on the mechanical switch in the on-state current branch circuit and turning on the fully-controlled devices in the current transfer module in the on-state current branch circuit;

(6) turning off the valve group consisting of fully-controlled devices connected in series in the current-breaking branch circuit;

(7) ending the reclosing.

The above descriptions are merely preferred embodiments of the present invention. It should be noted that persons of ordinary skill in the art can make several modifications and improvements without departing from the technical principle of the present invention. All these modifications and improvements shall fall within the protection scope of the present invention.

What is claimed is:

1. A direct current switch-off device, comprising an on-state current branch circuit and a current commutating and breaking unit which are connected in parallel, the on-state current branch circuit comprising a mechanical switch and a current transfer module which are connected in series, and the current commutating and breaking unit comprising a bridge-type branch circuit and a current-breaking branch circuit, characterized in that, the current-breaking branch circuit and two bridge arms of the bridge-type branch circuit are connected in parallel; the current-breaking branch circuit comprises one or more current-breaking modules connected in series; and each current-breaking module comprises a nonlinear resistor and a valve group consisting of fully-controlled devices connected in series, the nonlinear resistor and the valve group being connected in parallel, wherein two ends of each fully-controlled device in the valve group are connected in parallel with a buffering and reclosing circuit;

wherein the buffering and reclosing circuit comprises an RCD module and a reclosing module; the RCD module comprises an uncontrolled device, a capacitor, and two resistors; wherein the uncontrolled device and the capacitor are connected in series, a cathode of the uncontrolled device is connected to one end of the capacitor, and the two resistors are connected in parallel on two ends of the uncontrolled device and on two ends of the capacitor respectively; the reclosing module and the RCD module are connected in parallel.

2. The direct current switch-off device according to claim 1, characterized in that, the current transfer module comprises a nonlinear resistor and a fully-controlled device module which are connected in parallel;

the fully-controlled device module consists of one or more full-bridge submodules connected in series, each full-bridge submodule comprises four bridged fully-controlled devices and an RCD module, bridge arms of the full-bridge submodule are connected in parallel with the RCD module; and the RCD module comprises an uncontrolled device, a capacitor, and two resistors, wherein the uncontrolled device and the capacitor are connected in series, a cathode of the uncontrolled device is connected to one end of the capacitor, and the two resistors are connected in parallel on two ends of the uncontrolled device and on two ends of the capacitor respectively.

3. The direct current switch-off device according to claim 1, characterized in that, the buffering and reclosing circuit comprises a capacitor, a resistor, and a reclosing module which are connected in parallel.

4. The direct current switch-off device according to claim 1, characterized in that, the buffering and reclosing circuit comprises an RCD module and a reclosing module; the RCD module comprises an uncontrolled device, a capacitor, and two resistors; wherein the uncontrolled device and the capacitor are connected in series, a cathode of the uncontrolled device is connected to one end of the capacitor, and the two resistors are connected in parallel on two ends of the uncontrolled device and on two ends of the capacitor respectively; the reclosing module is connected in parallel on two ends of the capacitor in the RCD module.

5. The direct current switch-off device according to claim 3, characterized in that, the reclosing module comprises a resistor and a fully-controlled device which are connected in series.

6. The direct current switch-off device according to claim 3, characterized in that, the reclosing module comprises a resistor, a fully-controlled device, and an uncontrolled device; the resistor and the fully-controlled device are connected in series, the uncontrolled device is connected in parallel on two ends of the resistor, and the fully-controlled device and the uncontrolled device are connected in series in opposite directions.

7. A control method of a direct current switch-off device, characterized in that, comprising the following steps:
   when a direct current system is operating normally, turning on a mechanical switch, such that fully-controlled devices in a current transfer module are in an on-state; and a steady-state current passes through the mechanical switch and the current transfer module which are connected in series in an on-state current branch circuit;
   when a short-circuit failure occurs in the direct current system
      turning on a valve group consisting of fully-controlled devices connected in series in a current-breaking branch circuit, and blocking the fully-controlled devices in the current transfer module in the on-state current branch circuit;
      after the current in the on-state current branch circuit is completely transferred to a bridge-type branch circuit and the current-breaking branch circuit, turning off the mechanical switch in the on-state current branch circuit;
      after arc-free breaking of the mechanical switch, blocking the valve group consisting of fully-controlled devices connected in series in the current-breaking branch circuit, such that fault current is transferred into a nonlinear resistor till the system energy is dissipated by the nonlinear resistor, and direct current breaker completes breaking;
   when reclosing is performed after failure breaking
      turning on reclosing modules for the valve group consisting of fully-controlled devices connected in series in the current-breaking branch circuit;
      determining whether the faulty line is recovered;
         (1) if the line failure is not recovered, turning off the reclosing modules for the valve group consisting of fully-controlled devices connected in series in the current-breaking branch circuit, and ending the reclosing;
         (2) if the line failure is recovered, turning on the valve group consisting of fully-controlled devices connected in series in the current-breaking branch circuit, turning off the reclosing modules for the valve group consisting of fully-controlled devices connected in series in the current-breaking branch circuit,
      and performing the step of turning on the mechanical switch in the on-state current branch circuit and turning on the fully-controlled devices in the current transfer module in the on-state current branch circuit; and
      turning off the valve group consisting of fully-controlled devices connected in series in the current-breaking branch circuit, and ending the reclosing.

8. The control method of the direct current switch-off device according to claim 7, characterized in that, in the step of determining whether the faulty line is recovered, whether the line failure is recovered is determined based on the following criteria:
   the voltage on the faulty line is charged;
   no voltage exists on two ends of the current-breaking branch circuit;
   no voltage exists on two ends of the valve group consisting of fully-controlled devices connected in series in the current-breaking branch circuit;
   no voltage exists on two ends of each fully-controlled device in the valve group consisting of fully-controlled devices connected in series in the current-breaking branch circuit; and
   no voltage exists on two ends of the capacitor in the buffering and reclosing circuit for each fully-controlled device in the valve group consisting of fully-controlled devices connected in series in the current-breaking branch circuit.

* * * * *